United States Patent
Senoo

(10) Patent No.: US 7,817,898 B2
(45) Date of Patent: Oct. 19, 2010

(54) HARD DISK RECORDER

(75) Inventor: Junya Senoo, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1198 days.

(21) Appl. No.: 11/430,015

(22) Filed: May 9, 2006

(65) Prior Publication Data

US 2006/0269256 A1    Nov. 30, 2006

(30) Foreign Application Priority Data

May 9, 2005    (JP)    ............................. 2005-135716

(51) Int. Cl.
  *H04N 5/76*    (2006.01)
  *H04N 7/00*    (2006.01)
(52) U.S. Cl. ......................................... 386/46; 386/95
(58) Field of Classification Search .................... 386/46, 386/95, 83, 117; 348/207.1, 231.3, 159, 348/211
See application file for complete search history.

(56) References Cited

U.S. PATENT DOCUMENTS

| | | | | |
|---|---|---|---|---|
| 6,035,093 | A * | 3/2000 | Kazami et al. | 386/52 |
| 6,192,191 | B1 * | 2/2001 | Suga et al. | 386/120 |
| 6,266,479 | B1 * | 7/2001 | Kohri et al. | 386/68 |
| 6,400,378 | B1 * | 6/2002 | Snook | 715/716 |
| 6,430,355 | B1 * | 8/2002 | Nagasawa | 386/52 |
| 6,614,732 | B2 | 9/2003 | Nonaka et al. | |
| 6,931,201 | B2 * | 8/2005 | Obrador | 386/125 |
| 7,071,972 | B2 * | 7/2006 | Koyama | 348/211.3 |
| 7,154,535 | B2 * | 12/2006 | Yamasaki et al. | 348/207.1 |
| 7,474,348 | B2 * | 1/2009 | Suzuki et al. | 348/333.05 |
| 2004/0190873 | A1 | 9/2004 | Kito | |
| 2005/0030382 | A1 * | 2/2005 | Okamoto | 348/207.1 |
| 2006/0238619 | A1 * | 10/2006 | Takahashi | 348/207.1 |

FOREIGN PATENT DOCUMENTS

| | | |
|---|---|---|
| JP | 2001-291365 A | 10/2001 |
| JP | 2004-120401 A | 4/2004 |
| JP | 2004-304488 A | 10/2004 |

* cited by examiner

*Primary Examiner*—Thai Tran
*Assistant Examiner*—Gelek Topgyal
(74) *Attorney, Agent, or Firm*—Crowell & Moring LLP

(57) ABSTRACT

An HDD recorder connected to a DV camcorder via an IEEE 1394 serial bus cable comprises hard disks and a microprocessor having a function that when the HDD recorder is connected to the DV camcorder while a list display screen with a list of various recorded video files is displayed on a monitor, the microprocessor implements a process to edit the list display screen in a manner that based on source device-identifying information, and from the various recorded video files stored on the hard disks, the microprocessor extracts only the recorded video files dubbed from the DV camcorder, and displays the thus extracted recorded video files on the list display screen. This makes it possible for the HDD recorder to significantly reduce time and labor required to find, from the stored various recorded video files, a recorded video file dubbed from the DV camcorder.

8 Claims, 7 Drawing Sheets

VIDEO FILE RECORD FORMAT 60a

SOURCE-IDENTIFYING INFORMATION 62

VIDEO FILE RECORD FORMAT 60b

SOURCE-IDENTIFYING INFORMATION 62

RECORDED VIDEO FILE LIST DISPLAY SCREEN 70

FIG. 8

RECORDED VIDEO FILE LIST DISPLAY SCREEN 70E

THE FOLLOWINGS ARE RECORDED VIDEO FILES DUBBED FROM DV CAMCORDER

| RECORDING DATE (DUBBING DATE) | TITLE | RECORDING TIME | · · · |
|---|---|---|---|
| 4/3 (WED) | CHERRY BLOSSOM SEEING PARTY | 0 : 22 | · · · |
| 4/6 (SAT) | FAMILY TRAVEL (1) | 2 : 00 | · · · |
| 4/7 (SUN) | FAMILY TRAVEL (2) | 1 : 15 | · · · |
| 4/8 (MON) | SCHOOL ENTRANCE CEREMONY | 0 : 50 | · · · |
| 4/9 (TUE) | JOHN'S PARK DEBUT | 0 : 40 | · · · |
| 4/13 (SAT) | ZOO | 1 : 10 | · · · |
| | | | |
| | | | |

72

HARD DISK RECORDER

BACKGROUND OF THE INVENTION

1. Field of the Invention

The present invention relates to a hard disk recorder, which is to be connected to a DV (Digital Video) camcorder via an IEEE (Institute of Electrical & Electronics Engineers) 1394 serial bus cable.

2. Description of the Related Art

It is known that a hard disk recorder (or hard disk drive recorder, hereafter referred to as "HDD recorder") having an IEEE 1394 connection terminal can dub (copy or record) a recorded video file from a DV (Digital Video) camcorder via an IEEE 1394 serial bus cable. However, an increase in the recording capacity of the HDD results in an increase of time required to find, from recorded video files stored in the HDD recorder, a recorded video file dubbed (copied or recorded) from the DV camcorder. In particular, if the number of recorded video files stored in the HDD recorder is greater than, for example, 100, it considerably increases time and labor required to find such dubbed video file from the HDD recorder.

For reducing the time to find a target video file from recorded video files stored in the HDD recorder, it is known to sort, in advance, the recorded video files in the HDD recorder into groups based on genre, date and so on. However, this method is problematic because it requires a user to sort the recorded video files into groups in advance, thus requiring very laborious work.

SUMMARY OF TEE INVENTION

An object of the present invention is to provide a hard disk recorder that can significantly reduce time and labor required to find therefrom a recorded video file having been dubbed (copied or recorded) thereon from a DV camcorder.

According to a first aspect of the present invention, this object is achieved by a hard disk recorder to be connected via a cable to a source device(s) to be dubbed from, which includes a DV (Digital Video) camcorder, the video recorder comprising: an operation means for commanding and operating the DV camcorder and the hard disk recorder itself; an interface unit for sending and receiving control commands and response signals to and from the DV camcorder, and for receiving recorded video files from the DV camcorder; hard disks for storing various recorded video files including recorded video files received and dubbed from the source device(s) including the DV camcorder via the interface unit; and a microprocessor for controlling processes in the hard disk recorder itself when the hard disk recorder is connected to the DV camcorder, in which the processes include a process of editing and creating a list display screen for displaying a list of recorded video files, and a process of displaying the list display screen on a display means.

When a user, using the operation means, commands dubbing of a recorded video file from a connected source device to be dubbed from, the microprocessor dubs the recorded video file, and adds, to the thus dubbed recorded video file, source device-identifying information to identity the connected source device to be dubbed from (such information being hereafter referred to simply as "source-identifying information"). When the hard disc recorder is connected to the DV camcorder, the microprocessor implements a process such that based on the added source-identifying information, and from the various recorded video files stored on the hard disks, the microprocessor selectively extracts the recorded video files dubbed from the DV camcorder, and edits and creates a list display screen formed of the thus extracted recorded video files, and further outputs the thus created list display screen on the display means.

According to a second aspect of the present invention, the above-described object is achieved by a hard disk recorder to be connected via a cable to a source device(s) to be dubbed from, which includes a DV (Digital Video) camcorder, the video recorder comprising: an operation means for commanding and operating the DV camcorder and the hard disk recorder itself; an interface means for sending and receiving control commands and response signals to and from the DV camcorder, and for receiving recorded video files from the DV camcorder; hard disks for storing various recorded video files including recorded video files received and dubbed from the source device(s) including the DV camcorder via the interface unit; a list display screen editing means for editing a list display screen for displaying a list of recorded video files stored on the hard disks, the list display screen being displayable on a display means; a source-identifying information adding means for implementing a process such that when a user, using the operation means, commands dubbing of a recorded video file from a connected source device to be dubbed from, the source-identifying information adding means adds, to the dubbed recorded video file, source device-identifying information to identity the connected source device to be dubbed from (such information being herein referred to simply as "source-identifying information"); a connection detecting means for detecting connection of the hard disk recorder to the DV camcorder when the hard disk recorder is connected to the DV camcorder using the cable; and an edit control means for controlling the list display screen editing means to edit a list display screen of recorded video files when the hard disk recorder is connected to the DV camcorder.

When the connection detecting means detects the connection of the hard disk recorder to the DV camcorder, the edit control means implements a process such that based on the source-identifying information added by the source-identifying information adding means, and from the various recorded video files stored on the hard disks, the edit control means selectively extracts the recorded video files dubbed from the DV camcorder, and controls the list display screen editing means to edit and create a list display screen formed of the thus extracted recorded video files.

The hard disk recorder according to each of the first and second aspects of the present invention makes it possible to edit the list display screen such that when the hard disc recorder is connected to the DV camcorder while the list display screen with various recorded video files is displayed on the display means, the list display screen is edited in a manner that only the recorded video files having been dubbed from the DV camcorder are displayed on the list display screen. Thus, it becomes possible to significantly reduce time and labor required to find, from the hard disk recorder (hard disks), a recorded video file having been dubbed thereon from the DV camcorder, making it unnecessary for a user to sort, in advance, the recorded video files in the hard disk recorder into groups. Thereby, the user can easily process recorded video files dubbed from the DV camcorder, including processes such as reproduction and deletion of the recorded video files.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIG. 5A is a schematic chart showing an example of a video file record format in the case where only one source device of one same kind is connected to the HDD recorder, while

FIGS. 7 and 8 are respectively views of lists of recorded video files output from the HDD recorder onto a monitor before and after the HDD recorder is connected to the DV camcorder.

DESCRIPTION OF THE PREFERRED EMBODIMENTS

Embodiments of the present invention, as best mode for carrying out the invention, will be described hereinafter with reference to the drawings. The present invention relates to a hard disk recorder (or hard disk drive recorder, hereafter referred to as "HDD recorder") to be connected to a DV (Digital Video) camcorder via an IEEE 1394 serial bus cable. It is to be understood that the embodiments described herein are not intended as limiting, or encompassing the entire scope of, the present invention.

Figure 1:
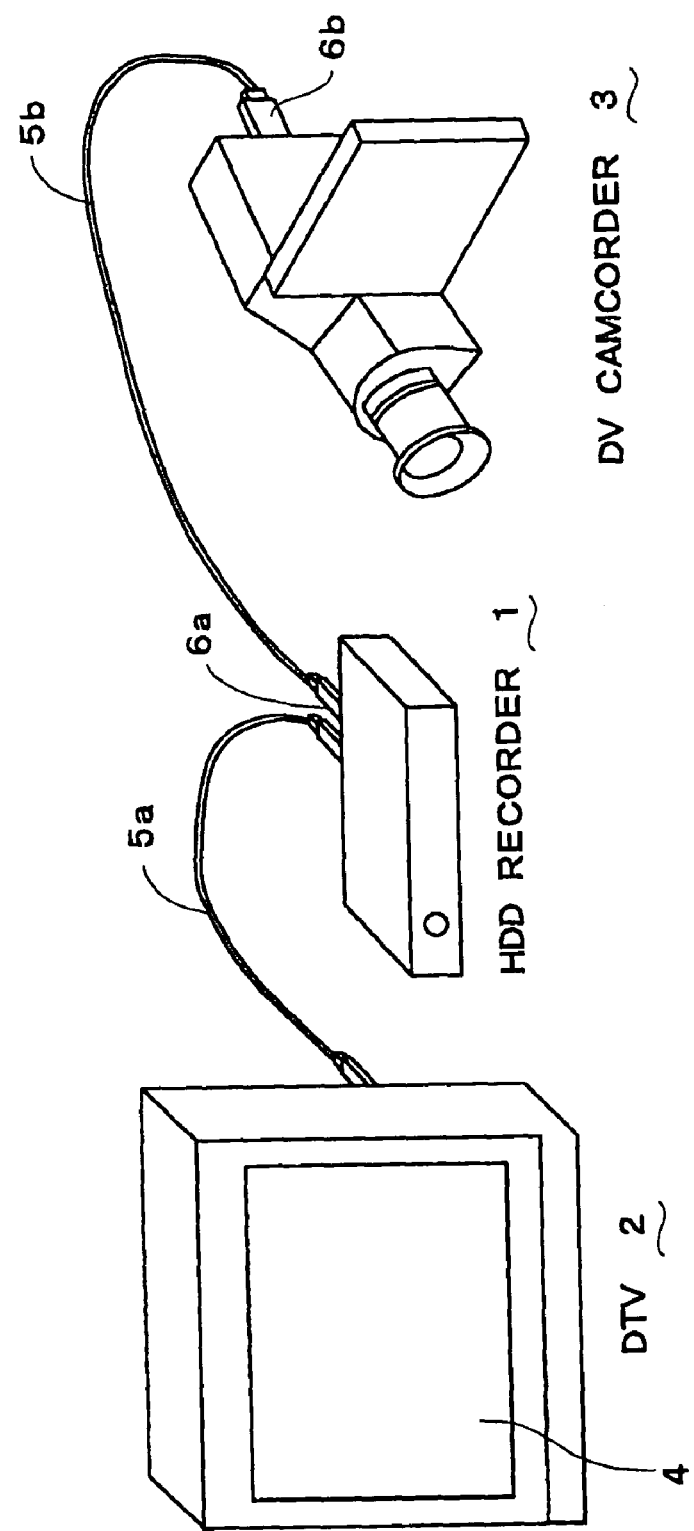
FIG. 1 is a schematic appearance of an HDD recorder according to an embodiment of the present invention connected to a digital television and a DV camcorder.

FIG. 1 is a schematic appearance of an HDD recorder 1 according to an embodiment of the present invention connected to a digital television (hereafter "DTV") 2 and a DV camcorder 3. The HDD recorder 1 has an IEEE 1394 connection terminal, and is an HDD recorder of a type that can be controlled by IEEE 1394 control commands to perform recording and reproduction. As shown in FIG. 1, the HDD recorder 1 can be, and is, connected to the DTV 2 and the DV camcorder 3 using an IEEE 1394 serial bus cables 5a and 5b (hereafter referred to simply as "cables" or "cable"), respectively. Basically, the HDD recorder 1 is continuously connected to the DTV 2, but is connected to the DV camcorder 3 only when needed, such as when dubbing a recorded video file from the DV camcorder 3.

For connecting the HDD recorder 1 to the DV camcorder 3, a user connects connectors 6a and 6b provided at respective ends of the cable 5b to a connection terminal of the HDD recorder 1 and a connection terminal of the DV camcorder 3, respectively. The DTV 2 has a built-in receiver for receiving digital television broadcast signals, and displays, on a monitor 4 (claimed "display means"), a video image based on a digital television broadcast signal received thereby. In addition, based on operations by the user on the HDD recorder 1, the DTV 2 displays, on the monitor 4, various images such as a menu image for the HDD recorder 1 and a list (table) display screen of recorded video files stored in the HDD recorder 1. The HDD recorder 1 can record various images such as those of digital television broadcasts received from the DTV 2 via the cable 5a, and photographed images (both still and moving images) received from the DV camcorder 3.

Figure 2:
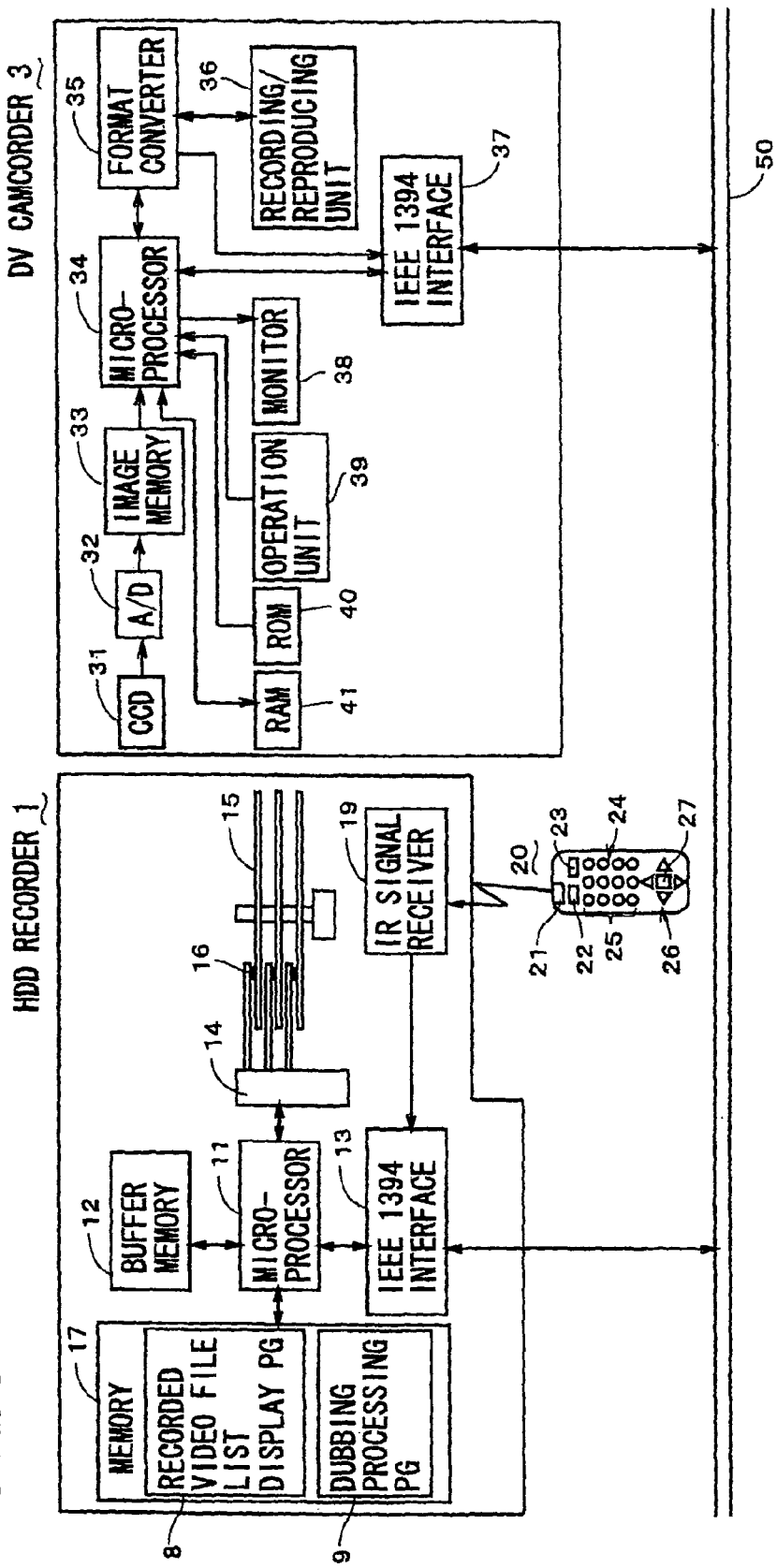
FIG. 2 is a schematic electrical block diagram of the HDD recorder as well as the DV camcorder connected to the HDD recorder.

FIG. 2 shows a schematic electrical block diagram of the HDD recorder 1 as well as the DV camcorder 3 connected to the HDD recorder 1 via an IEEE 1394 serial bus 50 (hereafter referred to simply as "bus"). The HDD recorder 1 comprises a microprocessor 11 which serves as a control means in a broad sense for controlling various elements and units therein, and more specifically as various means in cooperation with other elements such as a recorded video file list display program 8 and a dubbing processing program 9, as will be described later.

The HDD recorder 1 further comprises: a memory 17 storing control programs of the microprocessor 11 and various operational data; and an IEEE 1394 interface 13 (hereafter referred to simply as "interface") (claimed "interface unit" and "interface means") for sending and receiving data, including stream data such as recorded video file data and also including data such as control commands, to and from an external input/output device such as the DV camcorder 3 via the bus 50. The control programs stored in the memory 17 include a dubbing processing program 9 (hereafter referred to as "dubbing processing PG") composed of command codes describing a dubbing process of dubbing recorded video files in a DV tape for the DV camcorder 3, and also include a recorded video file list display program 8 (hereafter referred to as "recorded video file list display PG") comprised of command codes describing an editing process of editing a list display screen for displaying a list of recorded video files which are stored in the HDD recorder 1, and which include recorded video files having been dubbed from the recorded video files in the DV tape.

The HDD recorder 1 further comprises: multiple hard disks 15 as a recording medium; multiple magnetic heads 16 for recording and reading (reproducing) data on and from the hard disks 15; a head drive unit 14 for driving the magnetic heads 16; and a buffer memory 12 for temporarily storing data to be recorded or read (reproduced) data. The combination of the microprocessor 11 and the recorded video file list display PG 8 corresponds to the claimed "list display screen editing means", "edit control means", "connection detecting means" and "list display switching control means".

The edit control means is provided to control the list display screen editing means to edit a list display screen of recorded video files when the HDD recorder 1 is connected to the DV camcorder 3. Further, the combination of the microprocessor 11 and the dubbing processing PG 9 corresponds to the claimed "source-identifying information adding means". Note that in the present specification, the term "source" or "source device" is used to mean a device to be dubbed or recorded from, more specifically a device from which a video file (files) is dubbed or recorded onto the HDD recorder 1, as will be described in detail later.

The HDD recorder 1 still further comprises an infrared signal receiving unit (IR signal receiver) 19 for receiving an infrared signal sent from a remote control 20 (claimed "operation means"). The remote control 20, which a user uses to command and operate the DV camcorder 3 and the HDD recorder 1 itself, has an infrared signal sending unit 21 and a key unit 24 having various keys. The keys of the key unit 24 include a power supply key 23, numeric input keys 25, cursor keys 26, a decision key 27, and additionally, a menu key 22 to command the microprocessor 11 to display, on the monitor 4, various menus including a menu to command dubbing from the DV tape in the DV camcorder 3 onto the hard disks 15 of the HDD recorder 1.

On the other hand, the DV camcorder 3 is a DV camera with a built-in VCR (Video Cassette Recorder), and comprises: an IEEE 1394 interface 37 (hereafter referred to simply as "interface") for sending and receiving AV/C (Audio/Video Control) commands and responses to and from e.g. the HDD recorder 1 via the bus 50, and for sending recorded video files to e.g. the HDD recorder 1 via the bus 50; via the bus 50; a CCD (Charge Coupled Device) 31 for outputting a recorded image (image of a photographed object) in the form of analog signal; an A/D (Analog-to-Digital) converter 32 for converting an analog signal output from the CCD 31 to a digital signal; an image memory 33 for temporarily storing image data sent from the A/D converter 32; a microprocessor 34 for subjecting the image data stored in the image memory 33 to various image processing; a format conversion circuit (format converter) 35; and a recording/reproducing unit 36.

The format conversion circuit 35 converts the format of the image data, having been subjected to the image processing by the microprocessor 34, into a stream data. The recording/reproducing unit 36 writes or records, onto the DV tape, the stream data output from the format conversion circuit 35, and reproduces recorded video files recorded on the DV tape, and so on. The DV camcorder 3 further comprises: a liquid crystal monitor 38 for displaying images sent from the microprocessor 34; an operation unit 39; a ROM (Read Only Memory) 40 for storing various data such as control programs; and a RAM (Random Access Memory) 41 for storing e.g. various operational data.

Figure 3:
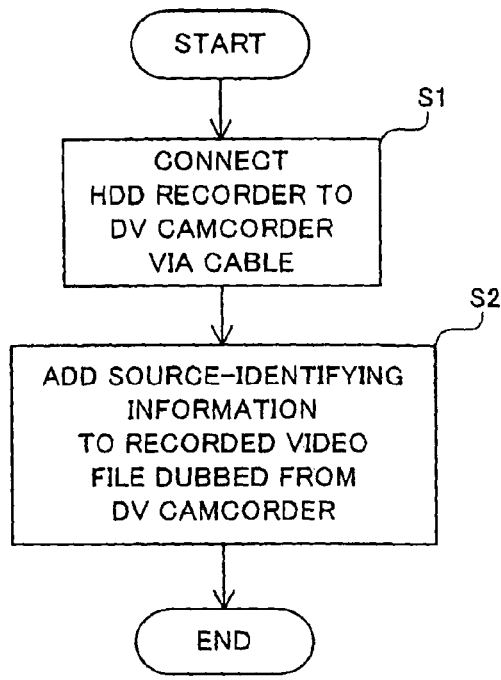
FIG. 3 is a flow chart showing a process of dubbing from the DV camcorder onto the HDD recorder.

Referring now to the flow chart of FIG. 3, the following describes a process performed by the HDD recorder 1 to dub (record or copy) a recorded video file (files) from the DV tape of the DV camcorder 3 onto the hard disks 15 of the HDD recorder 1. When a user connects the HDD recorder 1 to the DV camcorder 3 using the cable 5 (S1), and commands dubbing (recording) of a recorded video file from the DV camcorder 3 onto the HDD recorder 1 using the remote control 20, the microprocessor 11 of the HDD recorder 1 adds, to a recorded video file dubbed or created therein by the dubbing, source device-identifying information to identify a connected device, as a source device, from which the recorded video file is dubbed (such information being hereafter referred to as "source-identifying information"). In this case, such information is information to identify the DV camcorder 3.

Figure 4:
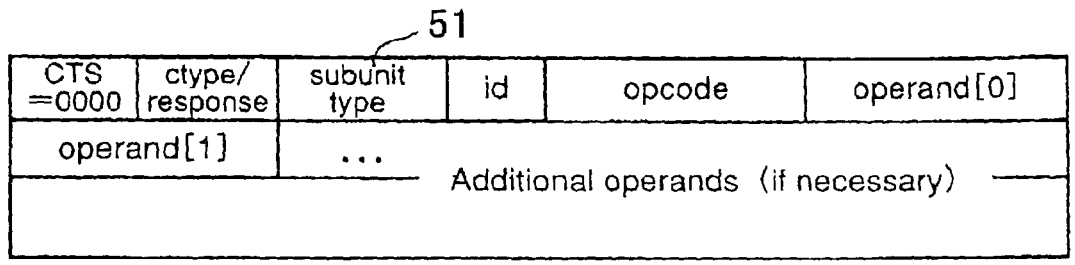
FIG. 4 is a schematic chart showing a format of an AV/C command (response) frame sent from the DV camcorder to the HDD recorder.

The microprocessor 11 then stores, on the hard disks 15, the recorded video file with the source-identifying information added thereto (S2). The microprocessor 11 identifies the kind of the connected source device based on e.g. a subunit type 51 (refer to FIG. 4), as subunit information, contained in a response sent back from such connected source device in response to an AV/C command sent to the connected source device, and edits the source-identifying information. Note that FIG. 4 is a schematic chart showing a format of an AV/C command (response) frame sent from the DV camcorder 3 to the HDD recorder 1.

Figure 5A:
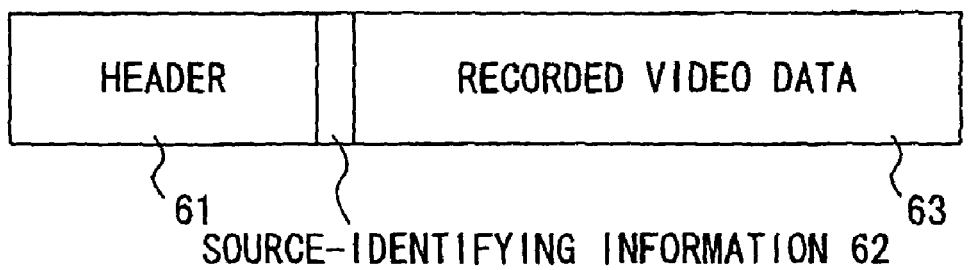
Figure 5B:
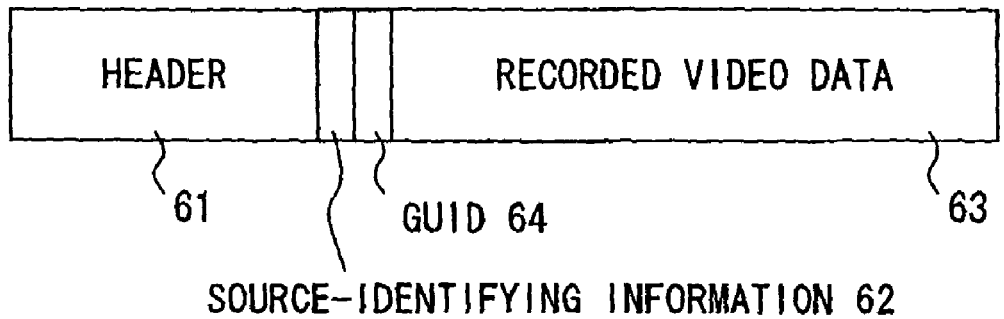
FIG. 5B is a schematic chart showing an example of a video file record format in the case where multiple source devices of one same kind are connected to the HDD recorder.

FIGS. 5A and 5B are schematic charts respectively showing examples of video file record formats (record formats of recorded video files) 60a and 60b having added thereto source-identifying information 62 such as described above. The video file record format 60a shown in FIG. 5A is an example in the case where only one source device of one same kind is connected to the HDD recorder 1, while the video file record format 60b shown in FIG. 5B is an example in the case where multiple source devices of one same kind are connected to the HDD recorder 1. More specifically, the video file record format 60a of FIG. 5A is formed of a header 61, source-identifying information 62 and recorded video data 63, while the video file record format 60b of FIG. 5B is formed of a header 61, source-identifying information 62, GUID (Global Unique Identifier) 64 and recorded video data 63.

In these FIGS. 5A and 5B, the source-identifying information 62 only or merely contains information about the kind of the source device(s) (connected to the HDD recorder 1), without containing information about the number of source device(s) of the one kind. Accordingly, if multiple source devices of one same kind are connected to the HDD recorder 1, it is not possible for the microprocessor 11 of the HDD recorder 1 to identify, based on the source-identifying information 62 alone, each connected source device from which the HDD recorder 1 has received data for the microprocessor 11 to use to create each recorded video file. In order to solve this problem, the video file record format 60b of FIG. 5B is designed to have data of the GUID 64 of each connected source device in addition to the source-identifying information 62. Thereby, even if multiple source devices of one same kind are connected to the HDD recorder 1, it is possible for the microprocessor 11 of the HDD recorder 1 to identify, based on the source-identifying information 62 and the GUID 64, each connected source device from which the HDD recorder 1 has received data for the microprocessor 11 to use to create each recorded video file.

Figure 6:
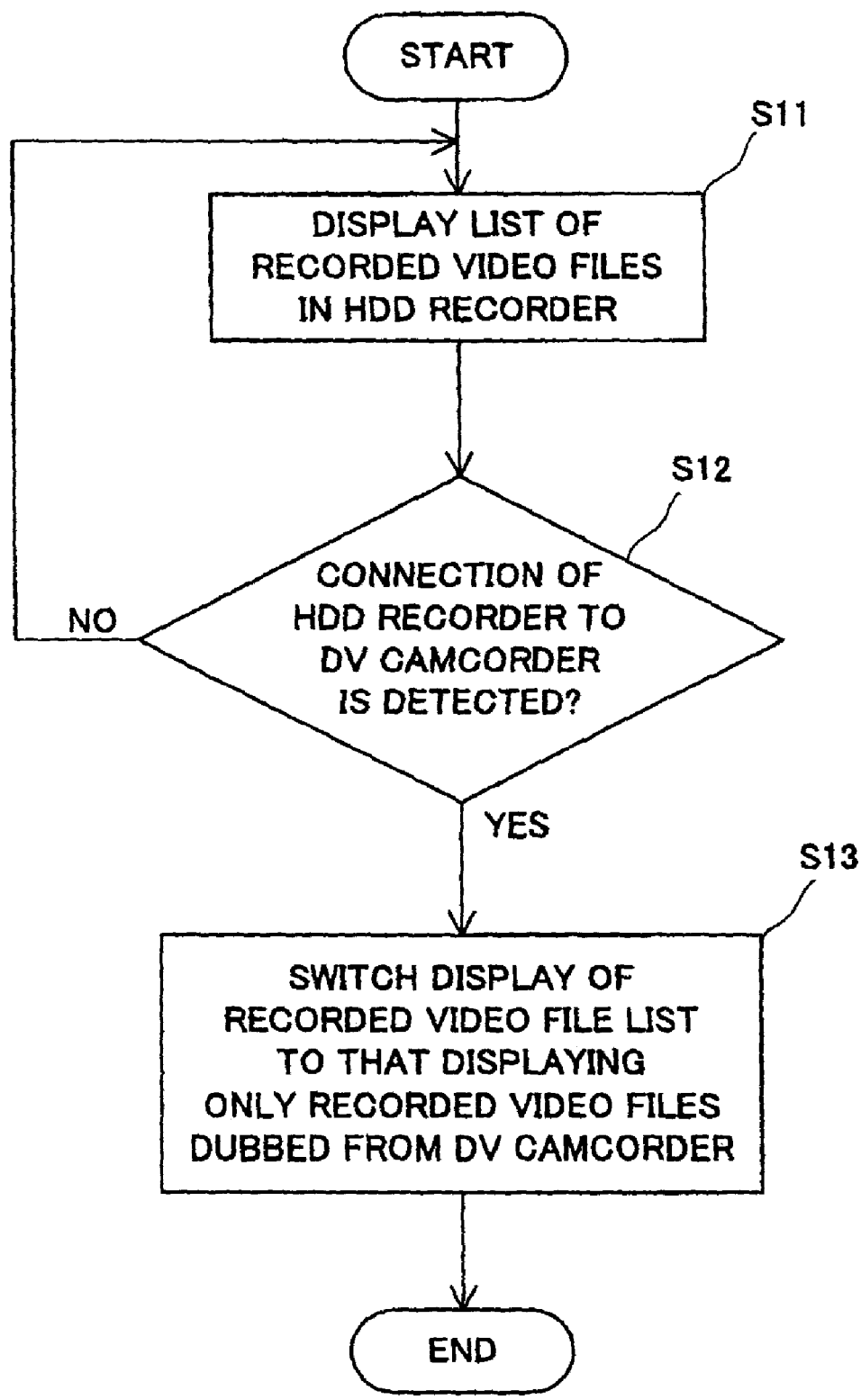
FIG. 6 is a flow chart showing a process of displaying lists of recorded video files including those having been dubbed from the DV camcorder.
Figure 7:
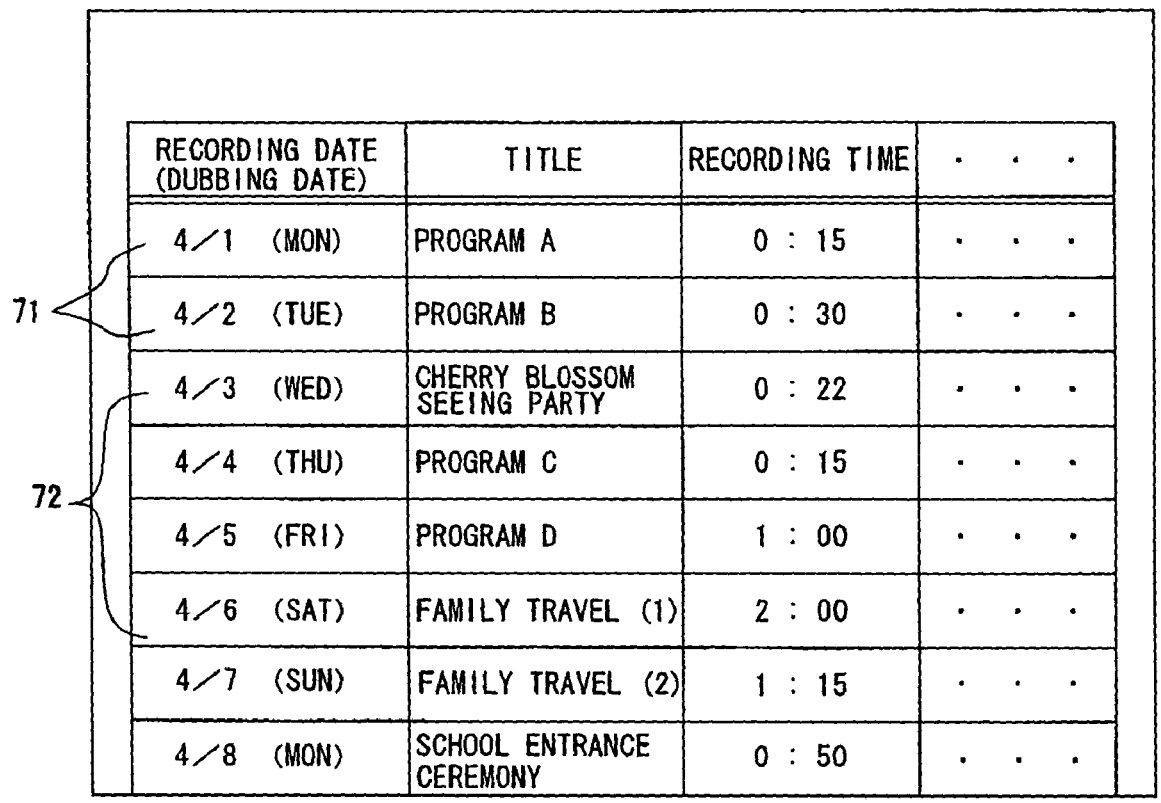

Referring now to the flow chart of FIG. 6 along with FIGS. 7 and 8, the following describes a process of displaying lists of recorded video files including those having been dubbed from the DV camcorder 3. FIGS. 7 and 8 are respectively views of lists (tables) of recorded video files output from the HDD recorder 1 onto the monitor 4 of the DTV 2 before and after the HDD recorder 1 is connected to the DV camcorder 3. As will be described in detail later, based on the source-identifying information 62 and from various recorded video files stored in the HDD recorder 1, the HDD recorder 1 according to the present embodiment can selectively extract the recorded video files dubbed from the DV camcorder 3 (more specifically, can extract only the recorded video files dubbed from the DV camcorder 3), and can display a list (table) of the thus extracted recorded video files on the monitor 4.

First, a user, using the remote control 20, commands the microprocessor 11 to display, on the monitor 4 of the DTV 2, a list display screen 70 to display various recorded video files (i.e. various video files including recorded video files 71 in addition to recorded video files 72 dubbed from the DV camcorder 3) stored in the HDD recorder 1 as shown in FIG. 7 (such list display screen being hereafter referred to as "recorded video file list display screen") (S11). Thereafter, when the user connects the HDD recorder 1 to the DV camcorder 3 using the cable 5b while the recorded video file list display screen is displayed on the monitor 4, the microprocessor 11 of the HDD recorder 1 detects, based on subunit information received from the DV camcorder 3, that the HDD recorder 1 has been connected to the DV camcorder 3 (YES in S12). More specifically, when the microprocessor 11 determines that the subunit information, which the HDD recorder 1 has received from the connected device, is subunit information of a camera subunit and a tape recorder/player subunit, the microprocessor 11 detects and determines that the HDD recorder 1 has been connected to the DV camcorder 3.

Thus, in the step S12, the microprocessor 11 of the HDD recorder 1 completes the detection of the connection of the HDD recorder 1 to the DV camcorder 3. Thereafter, based on the source-identifying information 62 in the video file record format 60a as shown in FIG. 5A, and from the various recorded video files stored on the hard disks 15 of the HDD recorder 1, the microprocessor 11 of the HDD recorder 1 selectively extracts the recorded video files 72, or more specifically extracts only the recorded video files 72, which have been dubbed from the DV camcorder 3, and edits and creates a recorded video file list display screen 70E (refer to FIG. 8) formed of the thus extracted recorded video files 72, more specifically formed only of the thus extracted recorded video files 72. The microprocessor 11 then controls to output the thus created recorded video file list display screen 70E on the monitor 4, i.e. switches the display of the recorded video file list display screen 70 to the display of only the recorded video files 72 dubbed from the DV camcorder 3 (S13).

As described in the foregoing, when the HDD recorder 1 according to the present embodiment is connected to the DV camcorder 3 while the recorded video file list display screen 70 having a list of various recorded video files is displayed on the monitor 4, the recorded video files dubbed from the DV camcorder 3 are selectively extracted (more specifically, only the recorded video files dubbed from the DV camcorder 3 are extracted) from various recorded video files stored on the hard disks 15 in the HDD recorder 1, and are displayed on the recorded video file list display screen 70E. This makes it possible to significantly reduce time and labor required to find, from the HDD recorder 1 (more specifically, from various recorded video files stored in the HDD recorder 1), a recorded video file having been dubbed (copied) from the DV camcorder 3 onto the HDD recorder 1, making it unnecessary for a user to sort, in advance, the recorded video files in the HDD recorder 1 into groups. Thus, the user can easily process recorded video files dubbed from the DV camcorder 3, including processes such as reproduction and deletion of the recorded video files.

It is to be noted that the present invention is not limited to the above-described embodiments, and various modifications are possible. For example, the above-described embodiments show the case in which the IEEE 1394 serial bus cable is used to connect the HDD recorder to the DV camcorder. However, the HDD recorder to which the present invention can be applied is not limited to an HDD recorder to be connected to, or connectable to, a DV camcorder by using an IEEE 1394 serial bus cable. For example, it can be an HDD recorder to be connected to, or connectable to, a DV camcorder by using a wireless LAN (Local Area Network).

Furthermore, the HDD recorder according to the above-described embodiments is designed such that when the HDD recorder is connected to the DV camcorder while the list of various recorded video files is displayed on the monitor, the HDD recorder displays the recorded video file list of only the recorded video files dubbed from the DV camcorder. However, the design can be changed so that regardless of whether or not a list of various recorded video files is displayed, the HDD recorder displays a recorded video file list of recorded video files dubbed from the DV camcorder.

The HDD recorder can also be designed so that when it is connected to the DV camcorder with the list of various recorded video files being displayed on the monitor, the HDD recorder displays a list of recorded video files stored in a recording medium in the DV camcorder such as DVD (Digital Versatile Disc) or memory card. In addition, if the connected source device is one of a type, such as DVD recorder, which is continuously connected to the HDD recorder, it can be designed so that when the power supply of the connected source device is turned on, the HDD recorder displays a list of only recorded video files dubbed from the connected source device.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

This application is based on Japanese patent application 2005-135716 filed May 9, 2005, the content of which is hereby incorporated by reference.

What is claimed is:

1. A hard disk recorder to be connected via a cable to a source device(s) to be dubbed from, which includes a DV (Digital Video) camcorder, the hard disk recorder comprising:

an operation means for commanding and operating the DV camcorder and the hard disk recorder itself;

an interface unit for sending and receiving control commands and response signals to and from the DV camcorder, and for receiving recorded video files from the DV camcorder;

hard disks for storing various recorded video files including recorded video files received and dubbed from the source device(s) including the DV camcorder via the interface unit; and a microprocessor for controlling processes in the hard disk recorder itself when the hard disk recorder is connected to the DV camcorder, in which the processes include a process of editing and creating a list display screen for displaying a list of recorded video files, and a process of displaying the list display screen on a display means, wherein when a user, using the operation means, commands dubbing of a recorded video file from a connected source device to be dubbed from, the microprocessor dubs the recorded video file, and adds, to the thus dubbed recorded video file, source device-identifying information to identity the connected source device to be dubbed from (such information being hereafter referred to simply as "source-identifying information"), and wherein when the hard disc recorder is connected to the DV camcorder, the microprocessor implements a process such that based on the added source-identifying information, and from the various recorded video files stored on the hard disks, the microprocessor automatically selectively extracts the recorded video files dubbed from the DV camcorder, and edits and creates a list display screen formed of the thus extracted recorded video files, and further outputs the thus created list display screen on the display means.

2. The hard disk recorder according to claim 1, wherein the interface unit is an IEEE (Institute of Electrical & Electronics Engineers) 1394 interface for sending and receiving AV/C (Audio/Video Control) commands and responses to and from the DV camcorder, and for receiving recorded video files from the DV camcorder.

3. The hard disk recorder according to claim 2, wherein the cable is an IEEE 1394 serial bus cable.

4. The hard disk recorder according to claim 3, wherein when the hard disk recorder is connected to the DV camcorder using the IEEE 1394 serial bus cable, the microprocessor detects the connection of the hard disk recorder to the DV camcorder based on subunit information received from the DV camcorder.

5. A hard disk recorder to be connected via a cable to a source device(s) to be dubbed from, which includes a DV (Digital Video) camcorder, the hard disk recorder comprising:

an operation means for commanding and operating the DV camcorder and the hard disk recorder itself;

an interface means for sending and receiving control commands and response signals to and from the DV camcorder, and for receiving recorded video files from the DV camcorder;

hard disks for storing various recorded video files including recorded video files received and dubbed from the source device(s) including the DV camcorder via the interface unit;

a list display screen editing means for editing a list display screen for displaying a list of recorded video files stored on the hard disks, the list display screen being displayable on a display means;

a source-identifying information adding means for implementing a process such that when a user, using the operation means, commands dubbing of a recorded video file from a connected source device to be dubbed from, the source-identifying information adding means adds, to the dubbed recorded video file, source device-identifying information to identity the connected source device to be dubbed from (such information being herein referred to simply as "source-identifying information");

a connection detecting means for detecting connection of the hard disk recorder to the DV camcorder when the hard disk recorder is connected to the DV camcorder using the cable; and an edit control means for controlling the list display screen editing means to edit a list display screen of recorded video files when the hard disk recorder is connected to the DV camcorder, wherein when the connection detecting means detects the connection of the hard disk recorder to the DV camcorder, the edit control means implements a process such that based on the source-identifying information added by the source-identifying information adding means, and from the various recorded video files stored on the hard disks, the edit control means automatically selectively extracts the recorded video files dubbed from the DV camcorder, and controls the list display screen editing means to edit and create a list display screen formed of the thus extracted recorded video files.

6. The hard disk recorder according to claim 5, wherein the interface means is an IEEE (Institute of Electrical & Electronics Engineers) 1394 interface for sending and receiving AV/C (Audio/Video Control) commands and responses to and from the DV camcorder, and for receiving recorded video files from the DV camcorder.

7. The hard disk recorder according to claim 6, wherein the cable is an IEEE 1394 serial bus cable.

8. The hard disk recorder according to claim 7, wherein when the hard disk recorder is connected to the DV camcorder using the IEEE 1394 serial bus cable, the connection detecting means detects the connection of the hard disk recorder to the DV camcorder based on subunit information received from the DV camcorder.

* * * * *